United States Patent [19]

Cresap et al.

[11] 4,362,281

[45] Dec. 7, 1982

[54] PYLON MOUNTING SYSTEM FOR REDUCING HELICOPTER VIBRATION

[75] Inventors: Wesley L. Cresap, Fort Worth; Alan W. Myers, Burleson; Sathy P. Viswanathan, Bedford, all of Tex.

[73] Assignee: Textron, Inc., Providence, R.I.

[21] Appl. No.: 238,466

[22] Filed: Feb. 26, 1981

Related U.S. Application Data

[63] Continuation of Ser. No. 16,403, Mar. 1, 1979, abandoned.

[51] Int. Cl.³ .............................................. B64C 27/00
[52] U.S. Cl. ................. 244/17.27; 188/379; 248/556; 416/500; 267/63 A; 267/140.3
[58] Field of Search ..................... 244/17.11, 17.27, 54; 188/378–380; 267/57.1 R, 57.1 A, 140, 141, 63 A, 35; 248/561, 562, 564, 567, 556, 557, 554, 596, 599, 603, 611, 632, 638; 74/574, 586; 416/500, 244 R, 134

[56] References Cited

U.S. PATENT DOCUMENTS

| 2,615,657 | 10/1952 | Young et al. | 248/554 |
| 2,890,846 | 6/1959 | Schloss | 267/141.4 |
| 3,163,378 | 12/1964 | Blake et al. | 244/17.27 |
| 3,845,917 | 11/1974 | Drees | 244/17.27 |
| 3,858,831 | 1/1975 | Halwes | 244/17.27 |
| 4,111,386 | 9/1978 | Kenigsberg | 244/17.27 |

FOREIGN PATENT DOCUMENTS

| 1269890 | 6/1968 | Fed. Rep. of Germany | 244/17.27 |
| 2150006 | 4/1973 | Fed. Rep. of Germany | 267/141.7 |
| 926842 | 10/1947 | France | 267/141.7 |

Primary Examiner—Galen L. Barefoot
Attorney, Agent, or Firm—Richards, Harris & Medlock

[57] ABSTRACT

A mounting for a helicopter pylon having a plurality of resilient vertical support links (24-27) between the pylon (12) and the helicopter fuselage (13). The links have a composite spring rate for a given pylon weight which establishes a resilient support for the fuselage from the pylon at the thrust required to support said fuselage in normal flight and in which oscillatory vertical force transmitted to fuselage is minimal for acceptable static deflections of the pylon.

Physical stops (24e, 24n, 24p) are operable to limit deflection between the pylon (12) and the fuselage (13) at predetermined rotor thrust above and below said normal thrust.

Links (24-27) are mounted at the ends of a pair of rigid beams (20, 21 and 22, 23) which are secured at the centers thereof to opposite sides of transmission portion of the pylon (12).

A vertical rigid mounting pin (24b) extends downward at the end of each beam.

A hollow vertical receptacle (24a) is secured to the fuselage and is coaxial with each pin (24b) and has a reentrant bore (24h) providing a down facing shoulder (24p).

A resilient body (24g) couples each pin to its receptacle.

An enlarged foot (24e) on each pin operates between the fuselage (13) and shoulder (24p) to limit deflection of pylon (12) and the resilient coupling (24g).

5 Claims, 10 Drawing Figures

PYLON MOUNTING SYSTEM FOR REDUCING HELICOPTER VIBRATION

This is a continuation of application Ser. No. 16,403 filed on Mar. 1, 1979 now abandoned.

TECHNICAL FIELD

This invention relates to pylon mountings for helicopters and more particularly to a pylon mounting system for reducing helicopter vibration.

BACKGROUND OF THE INVENTION

Helicopters, particularly in deceleration from normal flight, experience high oscillatory forces which generally are attributable to the helicopter blades becoming excited by reaction with blade wake vortices. More particularly, during deceleration, the blades overrun turbulent air. The result is that high vibrations are generated. The principal force generally is found to be at a frequency of N per revolution (N per rev), where N is the number of blades in the rotor. The higher harmonics of N per rev may also be present. However, the principal problem has to do with the N per rev oscillatory force, and the resulting vibrations.

Heretofore, various types of systems have been employed in attempting to minimize the unwanted oscillations involving decreasing the transmissibility from the pylon to the helicopter fuselage even though the oscillatory vertical shear (tension and compression) in the mast increases. Transmissibility may be understood to be the ratio of the forces transmitted to the fuselage, divided by the force at the hub that is generated by the rotor.

Prior art systems have been adversely affected by system damping, spring rate changes, RPM variations and lack of rigidity of the airframe structure in the pylon mounting area.

DISCLOSURE OF THE INVENTION

In accordance with the present invention, a soft pylon mounting is employed to achieve vibration reduction by decreasing the oscillatory vertical shear from the rotor even though it may increase the transmissibility. The invention provides a soft pylon mounting, whose operation is relatively unaffected by factors such as system damping, spring rate changes, RPM variations and structural stiffness in the pylon mounting.

In accordance with the invention, a mounting is provided for a helicopter pylon in which a plurality of vertical support links of resilient character are provided between the pylon and the helicopter fuselage, and have a composite spring rate to establish a resilient support level for the fuselage from the pylon, which level is below the level at pylon-fuselage resonance and such that the product of transmissibility and rotor oscillatory hub shear is low. Stop means are then provided which are operable to effect stiff linkages between the pylon and fuselage at predetermined load levels above and below the support level. The present invention is enhanced by increasing the mass of the pylon such as by mounting the transmission and engine together on a common support structure which forms the previously mentioned pylon.

DETAILED DESCRIPTION

FIG. 1

Figure 1:
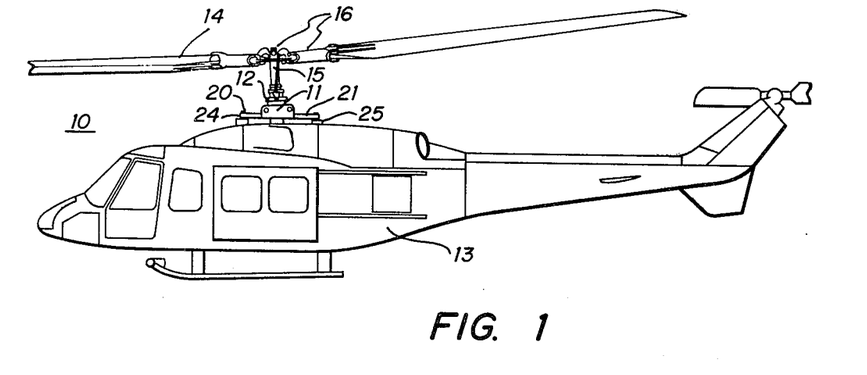
FIG. 1 is a schematic drawing of a helicopter provided with the pylon mounting system of the present invention.

Referring now to FIG. 1, a helicopter 10 has a mounting 11 for a transmission 12 on a fuselage 13. Transmission 12 drives a rotor 14 by way of mast 15. The helicopter pylon comprising transmission 12 is mounted on resilient supports of predetermined character and operable under all conditions of normal flight. The mounting 11 provides a support of unique character during flight conditions, particularly those conditions involved in deceleration. Upon deceleration, a pylon will normally respond to rotor induced vertical shear forces and induce high oscillatory forces into the fuselage 13. More particularly, the mounting 11 includes a plurality of arms 20 and 21 which are mounted or otherwise coupled to the fuselage 13 by resilient couplings so that the normal fuselage loads experienced during normal flight conditions, including deceleration, are borne by the resilient couplings 24 and 25. Pylon stops are provided to cooperate with arms 20 and 21, respectively, so that in operation under extreme maneuvers, the loads will be borne by the stops, in which case rigid couplings are effective between the pylon and the fuselage.

Figure 3:
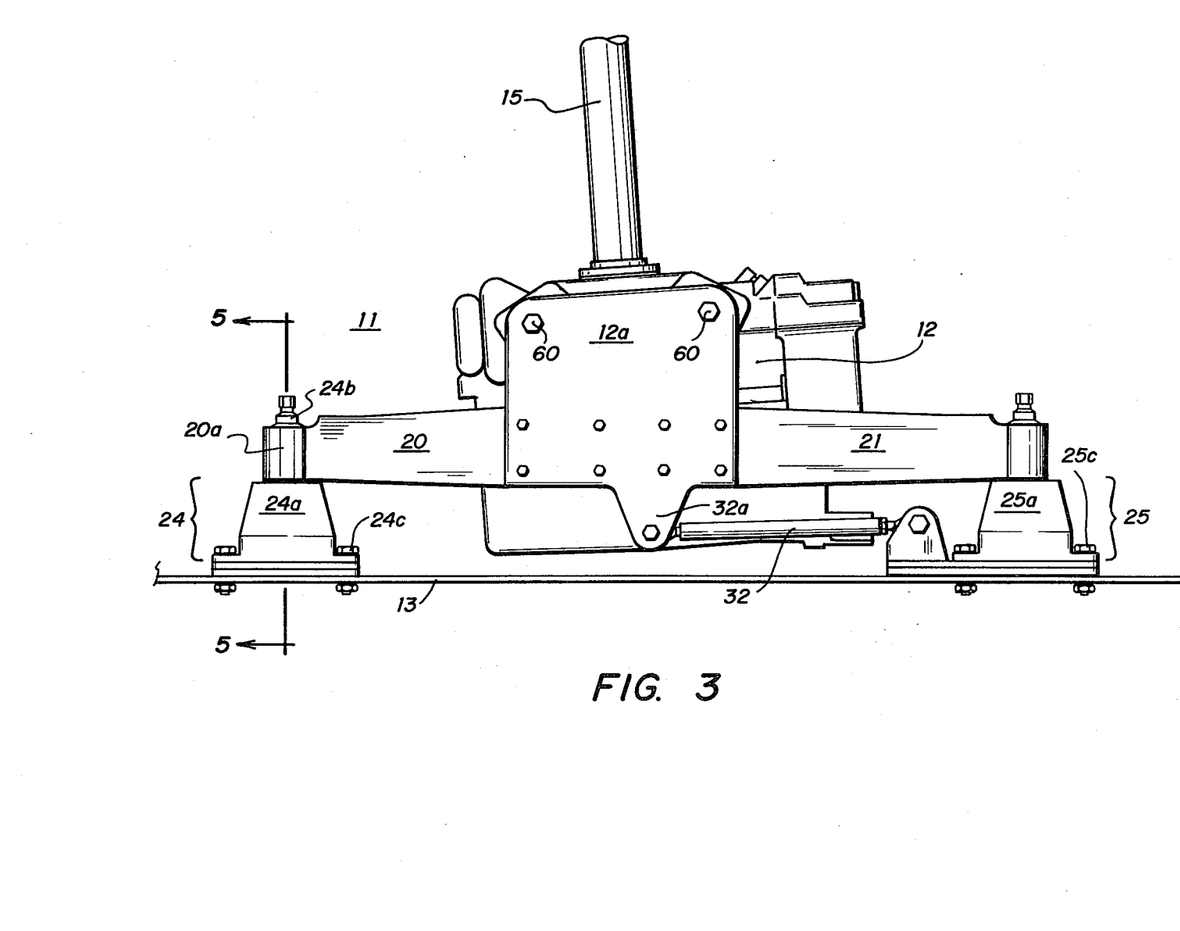
FIG. 3 is a side view of one embodiment of the mounting of the present invention.

As shown in FIG. 3, one or more antitorque links 32 may be provided between the transmission 12 and the fuselage 13, to oppose the torque on transmission 12.

FIG. 2

Figure 2:
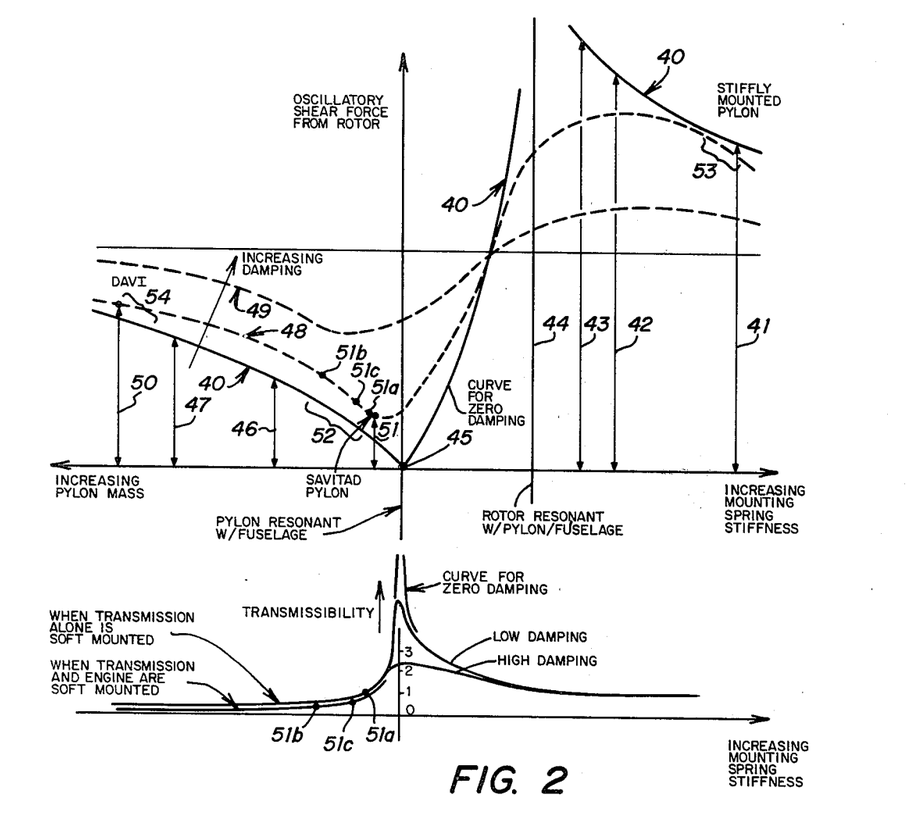
FIG. 2 illustrates oscillatory rotor shear forces, and transmissibility as a function of the hub impedance.

Referring now to FIG. 2, the graph illustrates the preferred area of operation. The invention provides what may be referred to as a soft pylon system, or more specifically as a System for Attenuating Vibration Independent of Tuning And Damping (SAVITAD). The relationships depicted in FIG. 2 are oscillatory hub shear forces, mounting spring rate and damping. Minimum airframe vibration is achieved when the force to the fuselage is minimized. Thus, it is desirable to minimize the forces from the rotor that are transmitted through the mountings and into the fuselage.

It has been known that for a rigid structured airframe coupled with zero damping by pylon restraints, accurately sized tuning masses may generate shear forces which will exactly counteract the forces in the pylon mounting springs and result in perfect isolation regardless of the size of hub shear. Damping in the mountings will increase the hub shear, but more importantly will change the phase of the loads in the support springs in relation to the forces in the activated mass linkage so that the system will no longer balance, thus increasing transmissibility and the oscillation in the helicopter. Further, changes in rotor speed or in mounting spring rate will cause imbalance and increase oscillation.

In avoidance of such problems, the soft pylon mounting system of the present invention provides mounting springs in combination with a pylon mass which results in low hub impedance.

In FIG. 2 the character of oscillatory shear forces from the rotor is shown as a function of mounting spring stiffness and pylon mass. The vertical axis of the graph of FIG. 2 is scaled in terms of the magnitude of oscillatory shear forces from the rotor. The horizontal axis is scaled as to be in terms of spring rate of the pylon mounting to the fuselage.

Lower part of FIG. 2 shows the variation of transmissibility with mounting spring stiffness. Transmissibility is the ratio of the force transmitted to the fuselage divided by the shear force from the rotor. The vibration in the fuselage is proportional to the force transmitted to the fuselage which is obtained as the product of shear force from the rotor multiplied by transmissibility, both of which are plotted in FIG. 2.

The curve 40 is a plot of theoretical hub shear force versus mounting spring rate. For very stiffly mounted pylon, the shear forces are high, with the ordinate 41 being representative. Transmissibility has a value near 1.0 meaning that almost all shear force from the rotor is transmitted into the fuselage. As the spring rate decreases toward a point at which the rotor becomes resonant with the pylon/fuselage, the magnitude of the oscillatory shear force increases such as at ordinates 42 and 43. The forces progressively increase magnitude until at resonance 44, absent any damping, the oscillatory shear forces become infinite, but the transmissibility is still low. Below resonance, forces are initially large, but at point 45 actually go to zero at a point where the pylon is resonant with the fuselage. At this pylon mounting stiffness the pylon/fuselage does not impede the motion of the rotor, i.e., the rotor could behave as if it is a free rotor with no attachment to the fuselage. At a spring rate such that there is essentially a free rotor, a condition occurs where the oscillatory forces induced into the pylon are very low, but the transmissibility is high so that large vibrations will result. Below the point 45 the oscillatory forces increase successively as indicated by ordinates 46 and 47, and the transmissibility becomes very low.

Dotted lines 48 and 49 represent curves for progressively increasing damping in the system.

A typical operating point for a system such as shown in U.S. Pat. No. 3,322,379 (DAVI) is represented by ordinate 50. Typical of operation of the present invention is in the area of point 51.

The stiff pylon mounting typically characterized by range 53 involves high rotor forces and moderate transmissibility.

The prior art mounting near range 54 involves moderate rotor forces and very low transmissibility.

The soft pylon of the present invention in a range 52 involves very low rotor forces and moderate transmissibility.

Thus, in accordance with the invention, the pylon mounting is made purposely soft and of such character as to provide operation near the point represented by ordinate 51, (area 52), FIG. 2, for normal flight conditions including level flight and deceleration. In the soft mounted pylon system shown in FIG. 1 the transmissibility can never be zero since the motion of the pylon will generate loads in the mounting springs which will be transmitted to the airframe. However, if the mounting springs are soft enough in relation to the pylon mass so that the rotor shear is quite low, then the product of rotor shear multiplied by transmissibility will be low enough to give low vibration levels in the fuselage. Changes in mounting spring stiffness or increases in damping will influence rotor shear and/or transmissibility only slightly. Likewise, minor changes in rotor speed or airframe structural differences will not alter the vibration of the fuselage significantly, since the oscillatory forces from the rotor will remain low.

It should be pointed out that the transmission of the DAVI system which operates in area 54 of FIG. 2 is not physically mounted on soft springs. In spite of that, the dynamic character shown in FIG. 2 is achieved by the DAVI system by means of levered-weights which are oscillated by the motion of the pylon itself. Because of the high lever ratio, the activated masses increase the effective mass of the pylon.

FIG. 3

Referring now to FIG. 3, a side view of the pylon mounting 11 is shown. The mount structure includes arms 20 and 21 and plate 12a. They are secured to the transmission 12 by bolts 60.

Couplings 24, 25 and two additional couplings not shown in FIG. 3 are all similar.

Coupling 24 comprises a housing 24a. Housing 24a is secured by bolts 24c, directly and rigidly to the fuselage 13. A bolt 24b is rigidly secured in a hole passing through the end 20a of the arm 20. Bolt 24b extends axially into the housing 24a where it is resiliently mounted as will be shown in FIG. 5.

FIG. 4

Figure 4:
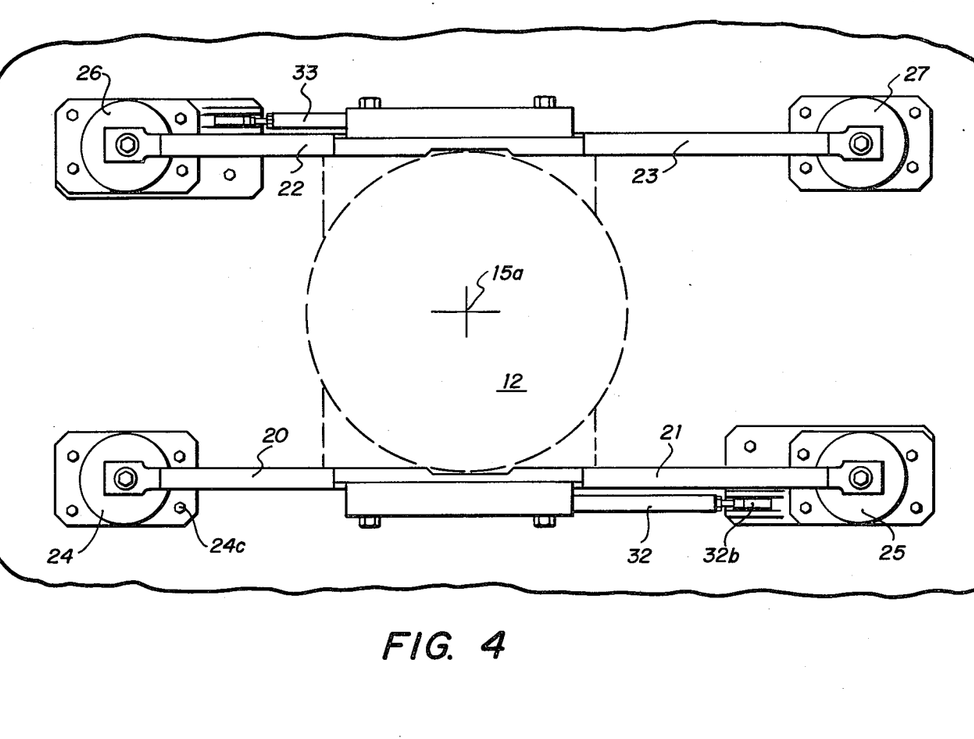
FIG. 4 is a top view of the system of FIG. 3.

FIG. 4 is a plan view of the mounting system of FIG. 3. Arms 20 and 21 are integral one with the other. Arms 22 and 23 are also provided on the side opposite arms 20 and 21. The four 20–23 arms are coupled to the fuselage by four resilient pads 24–27. Thus, the mounting system is more or less symmetrical about the axis 15a of the mast. The pads 24–27 are mounted to the fuselage by bolts such as bolt 24c. It will be note that two fore/aft antitorque links 32 and 33 are provided. Link 32 is coupled to tab 32a on plate 12a and to a pivotal link 32b on the mounting plate of coupling 25. It may also be noted that the pylon torque may be reacted without the use of the antitorque links 32 and 33 by means of side forces on the couplings 24–27, if they are sized properly for this load in addition to the fundamental vertical load.

FIG. 5

Figure 5:
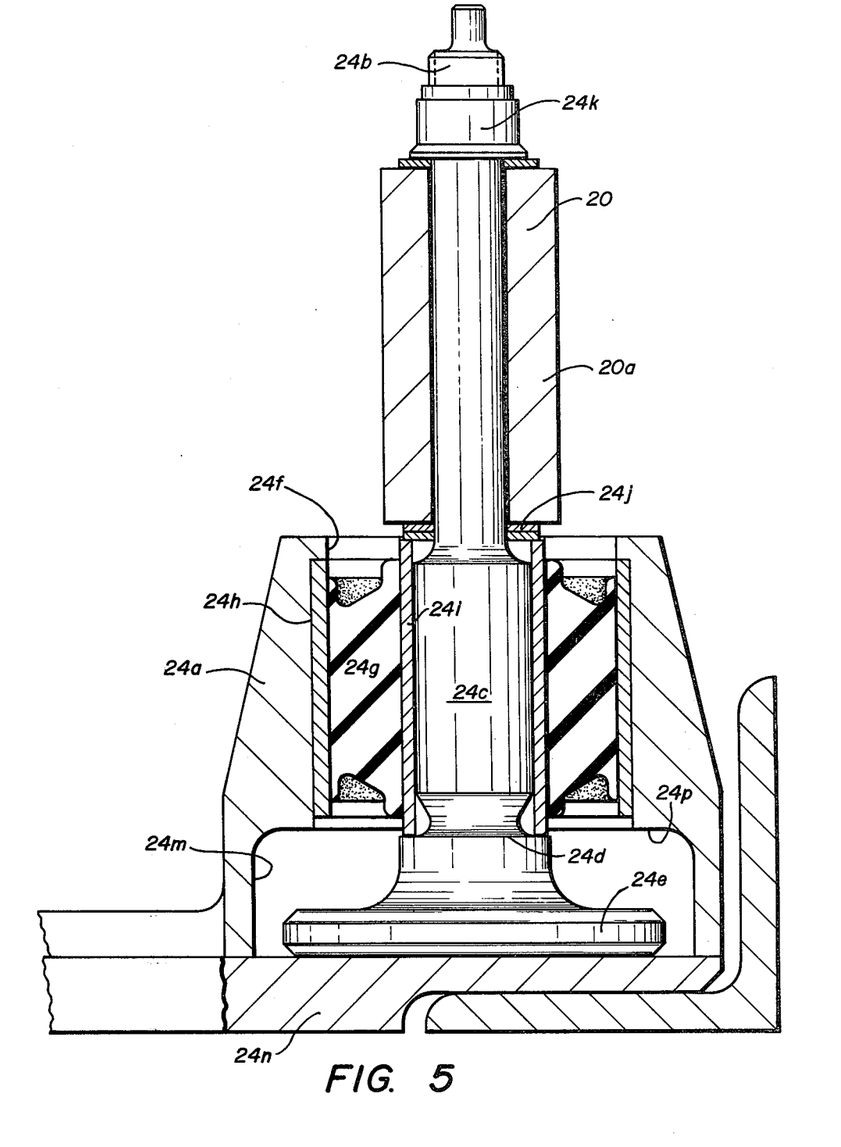
FIG. 5 is a detailed sectional view taken along lines 5—5 of FIG. 3.

FIG. 5 illustrates a sectional view of the mounting taken along lines 5—5 in FIG. 3 at the end of arm 20. Bolt 24b is shown extending above the top of the arm 20 and is of small diameter. Bolt 24b has a lower portion 24c of enlarged diameter below which there is provided still a larger diameter shoulder 24d. Below shoulder 24d is a disc-like foot 24e.

The housing 24a has a central bore 24f of cylindrical shape to which an elastomeric bushing 24g is secured. Bushing 24g includes an outer cylinder 24h which is rigidly and securely coupled to housing 24a. It also includes an inner cylinder 24i which is secured to the outer cylinder 24h by the resilient elastomeric body 24g. The lower end of cylinder 24i rests on shoulder 24d and mates with the enlarged section 24c of bolt 24b. The upper end of cylinder 24i bears against washers 24j which in turn bear and are forced against the bottom of the enlarged end portion 20a of arm 20. A nut 24k is threaded onto the upper end of bolt 24b to rigidly secure bolt 24 and the inner cylinder 24i.

The bore 24f has a reentrant portion 24m which is somewhat larger than the diameter of the disc 24e. The mounting plate 24n of the coupling 24 is secured to the lower end of housing 24a and forms a closure therefor with its surface forming a base on which the disc 24e may rest. Mounting plate 24n is rigidly attached to fuselage 13. When the helicopter is at rest on the ground, the weight of the pylon and rotor is transmitted from disc 24e to the mounting plate 24n. Thus, the static load of the rotor system is rigidly supported. In normal flight, the disc 24e raises off of the base plate 24n and operates freely and resiliently between the upper surface of the plate 24n and the lower down facing shoulder 24p. The elastomeric body 24g could be preloaded in tension by designing the length of the bolt 24b and by means of tightening bolts 24c. Once this is done, the disc 24e will not raise off of the base plate 24n until the preload is overcome by the rotor thrust. Under extreme maneuver commands where rotor thrust is generated beyond that involved in normal maneuvers, the upper surface of the disc 24e will engage the shoulder 24p to provide a rigid coupling for extreme maneuvers, the resilient body 24g being elongated under such extreme loads as to permit disc 24e to contact shoulder 24p.

In one embodiment of the invention, the preferred system was employed on a Bell Helicopter aircraft, Model No. 206L-M, wherein the gross weight was approximately 4000 pounds. Four mountings such as mounting 24 equally shared the load. The elastomeric body 24g was about 1 inch inside diameter, about 2.75 inches outside diameter, about 2.2 inches in length, and had a spring rate of 1800 pounds per inch. The SAVI-TAD pylon mounting system made possible very low cabin vibrations throughout the flight spectrum.

Referring back to FIG. 2, the pylon mounting stiffness should be chosen so as to minimize the vibration, which implies minimizing the product of oscillatory shear force from the rotor, and transmissibility. For a specified mass of the pylon, the softer the spring rate to the left of region 52, higher will be the hub shear force, but lower will be transmissibility and the product will be lower. It turns out that region 52 is the preferred location, because, even though marginal improvements in vibration could be made with a softer mounting, there are severe practical limitations to softness in the mounts from considerations of allowable pylon deflections. Region 52 represents the design of the present invention.

After choosing the spring rate, the stops are designed in accordance with the allowable pylon deflections. The present pylon mounting reduces vibrations in high speed flights and maneuvers also, in addition to reducing vibrations in deceleration where its performance is most impressive. If the allowable deflections of the pylon are large, then the window between the upper and lower stops would be made proportionately large. On the other hand, if other considerations restrict large deflections of the pylon, then the window between the stops would be reduced. The stops also function as means by which the rotor thrust could be transmitted to fuselage in case of failure of the resilient coupling.

If only a small window is allowed between the stops, then the resilient coupling between the pylon and the fuselage may be preloaded so that the pylon will unseat from the fuselage only if the thrust reaches, for example, 80% of the lowest gross weight. The upper stop may be contacted when the thrust equals, for example, 120% of the highest gross weight. This arrangement insures that the pylon will be active for decelerations and high speed flights at all gross weights. In severe maneuvers, the upper stops would be contacted and rigid couplings result between the pylon and fuselage. This has not been of any problem in tests with the Bell Helicopter aircraft Model 206L-M.

Figure 6:
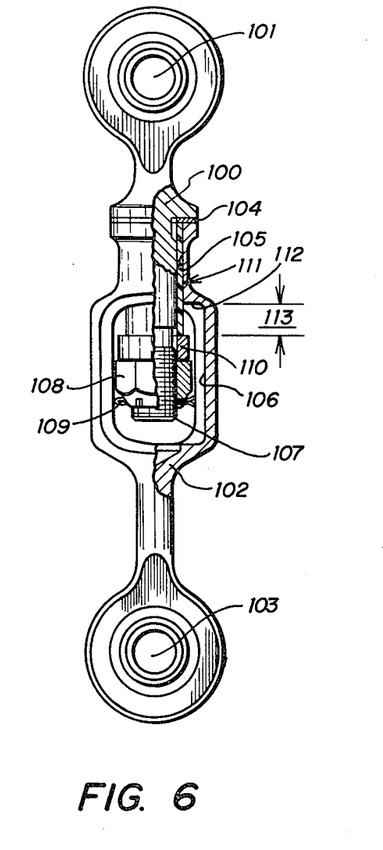
FIG. 6 is a schematic drawing of an adjustable, vertical restraint assembly.
Figure 7:
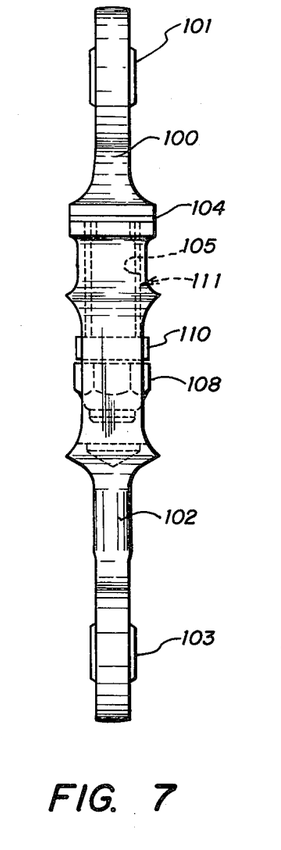
FIG. 7 is a side view of the vertical restraint assembly of FIG. 6.

FIGS. 6 and 7

The transmission case of the pylon may have three or more arms integral to the case and house the pins that are attached to the resilient couplings, and the vertical motion stops may be provided separately from the mounts. An adjustable vertical restraint assembly of FIGS. 6 and 7 may be employed to provide this stop. Referring to FIG. 6, the inner member 100 is attached to pylon by a uniball coupling 101. An outer member 102 is connected to the fuselage by coupling 103. The inner member 100 has a stop limit shoulder 104. The outer member 102 has a hollow central cavity having an upper small cylindrical bore 105 and a lower large cylindrical bore 106. Diametrically opposite sides of the lower portion 106 are cut away so that the interior portions are accessable.

The lower end of the inner member has a threaded section 107 onto which a nut 108 is threaded and secured by a pin 109. An upper stop sleeve 110 is mounted immediately above nut 108. A plastic bushing 111 of a nylon type material of cylindrical shape encases the inner member and extends between the upper surface of the stop sleeve 110 and the lower surface of shoulder 104.

In FIG. 7, a side view of the unit is shown. As the pylon moves up, the upper stop sleeve 110 moves up until it contacts the shoulder 112 on outer member 102. The allowable travel of the pylon is the distance 113. The assembly of FIGS. 6 and 7 provides no vertical restraint at all when the motion of the pylon is between the lower and upper stops. Rigid coupling is effective between the pylon and fuselage once either stop is contacted. It may be designed so that in maneuvers involving rotor thrust above a certain value, the upper stop 112 would be contacted so that most of the rotor load beyond that thrust would be transmitted to fuselage through this restraint assembly. This assembly will provide the restraint required in case of failure of one or more of the supports of the pylon.

FIGS. 8, 9, & 10

Figure 8:
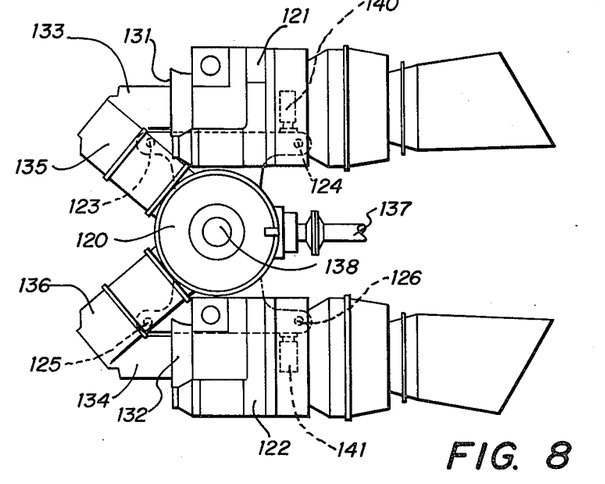
FIG. 8 is a top view of an engine and transmission mounted together as a unit on resilient mounts.
Figure 9:
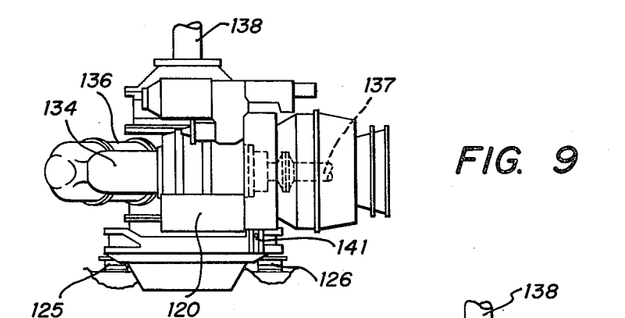
FIG. 9 is a side view of the system of FIG. 8.
Figure 10:
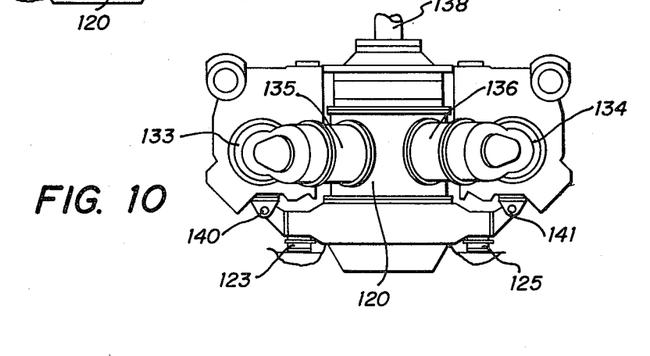
FIG. 10 is an end view of the system of FIG. 8.

FIG. 8 shows an arrangement where a transmission 120 is mounted together with the engines 121 and 122 as a single unit on resilient pylon supports 123-126. With this arrangement, the engine and transmission comprise the pylon, with much more mass than is possible when the transmission alone is mounted on the mount springs. The attachment of the engines to the transmission should be so rigid as to place the frequency of the engine vertical mode on the transmission above N per rev. As shown in FIG. 8, engine 121 has an air inlet 131. Engine 122 has an air inlet 132. The engine output shaft housings 133 and 134 extend forward along opposite sides of transmission 120 and with the shafts being coupled through intermediate shafts in housings 135 and 136 which extend into transmission 120 at angles approximately 45 degrees from the axis of the motors 121 and 122 and 90 degrees with respect to one another. Tail rotor shaft 137 extends from the rear of the transmission 120. The mast 138 extends upward from the transmission. It will be apparent that the engines 121 and 122 rigidly mounted to the transmission 120 provide the system of increased mass for support by the resilient mountings 123-126 which may be of the type above described. As shown in FIG. 10, the engine 122 is coupled to the transmission structure by way of an engine support or mount 141. As shown in FIG. 8, engine mounts 140 and 141 provide support for engines 121 and 122 slightly rearward of transmission 120 with the shaft housings 133-136 providing the additional support for the front ends of the engines relative to the housing 120.

The point 51a, FIG. 2, may represent the operating condition with only the transmission being soft mounted. Then point 51b will be the operating point if engine is also mounted along with the transmission, and the mount spring rate is not changed. If now the spring rate is increased, then the operating point could be moved to point 51c.

Transmissibility is approximately equal to $K/(mw^2-K)$ where K is the total vertical spring rate of the resilient pylon mounts, and m is the mass of the pylon and w is the N per rev frequency. It is clear that by increasing m and holding K constant, transmissibility will decrease from point 51a to point 51b. Also, by increasing K and holding m constant at the higher value thereof, transmissibility will increase from point 51b to point 51c. Vibration in the fuselage is proportional to the product of the two functions plotted in FIG. 2. It turns out that point 51b results in lower vibration than point 51a, and at point 51c the vibration approximately equals the vibration at point 51a.

Hence the mass of the engine can be utilized either to further reduce vibrations in conjunction with same soft spring configuration, or to increase the mount spring rate for equal vibrations. Mounting the engine on the transmission also eliminates the input shaft misalignments and thereby simplifies its design considerably.

The present system has an influence on the stability of the helicopter in air-resonance. Air-resonance is a phenomenon where the blade lead-lag motions are cyclically excited by the pitch and roll motions of the pylon and fuselage, and also where the resulting shear forces from the rotor excite the motions of the pylon-fuselage system. This phenomenon is potentially catastrophic and is usually avoided by incorporating blade lead-lag dampers.

With the present soft pylon-mounting system, the stability of the lead-lag motion theoretically would increase. Such an increase was verified in flight tests. The increased damping may be explained as follows: The in-plane rotor shear created by the lead-lag motion results in pitch and roll rotations of the pylon. The magnitude of rotation is increased because of soft mounting. This produces gyroscopic forces which in turn flap the blades. The flapping motion is impeded by the flap-damping aerodynamic forces. Thus the assumed lead-lag motion causes blade damping, implying thereby that the lead-lag stability is enhanced. Thus the blade motion is stabilized without the incorporation of the lead-lag dampers.

We claim:
1. In a helicopter with a fuselage and a pylon including a main rotor, a mount for interconnecting the pylon and fuselage and for attenuating rotor excitation forces, which comprises:

four laterally spaced apart resilient support links arranged in two longitudinally spaced apart pairs interconnecting the pylon and fuselage for relative vertical motion, said links having a predetermined composite spring rate of low stiffness relative to the pylon mass in order to resiliently support said fuselage from said pylon during level flight in an operational region immediately below the point where said pylon and fuselage would resonate so as to attenuate oscillatory forces from the rotor and thereby reduce vibration in said fuselage; and stop means interconnected between said pylon and fuselage for rigidly limiting vertical deflection therebetween;

said resilient support links being preloaded downward such that said pylon and fuselage are rigidly connected by said stop means up to a predetermined rotor thrust below that necessary to achieve flight.

2. In a helicopter with a fuselage and a pylon including a rotor, a mount for coupling the fuselage to the pylon while attenuating rotor excitation forces which comprises:

a pair of fore/aft beams rigidly secured at the centers thereof to opposite sides of a portion of said pylon;

a vertical pin rigidly secured to the end of each of said beams;

a hollow vertical receptacle rigidly secured to the fuselage coaxial with each of said pins, each receptacle having an upper bore and a lower relatively larger reentrant bore;

an annular elastomeric body connected between each pin and the upper bore of the corresponding receptacle, said elastomeric bodies having a predetermined composite spring rate of low stiffness relative to the pylon mass in order to resiliently support said fuselage from said pylon during level flight in an operational region immediately below the point where said pylon and fuselage would resonate so as to attenuate oscillatory forces from the rotor and thereby reduce vibration in said fuselage; and an enlarged foot rigidly secured to each pin and positioned within the reentrant bore of the corresponding receptacle, said feet and receptacles cooperating to rigidly limit vertical deflection between said pylon and fuselage;

said elastomeric bodies being preloaded downward such that said pylon and fuselage are rigidly coupled by said feet and receptacles up to a predetermined rotor thrust below that required to achieve flight.

3. The mount of claim 2, further including a pair of oppositely extending rigid links each secured at one end to said pylon and at the other end to said fuselage, said links being essentially horizontal and arranged to react pylon torque without substantially restricting vertical movement of said pylon.

4. The mount of claim 2 wherein said feet and receptacles are operable to effect rigid connection between said pylon and fuselage at rotor thrusts below and above, respectively, about 80% and 120% of the rotor thrust necessary to achieve flight.

5. An attenuator mount for interconnecting the fuselage and pylon of a helicopter while attenuating rotor excitation forces, comprising:
- said pylon including at least one engine drivingly and rigidly connected to a transmission which drives a mass supporting a main rotor;
- at least three generally horizontal arms rigidly secured to the transmission of said pylon;
- spring means connected between the end of each arm and said fuselage for resiliently supporting said fuselage from said pylon during level flight;
- said spring means having a predetermined composite spring rate of low stiffness relative to the pylon mass selected to operate in a region immediately below the point where said pylon and fuselage would resonate in order to attenuate oscillatory forces from the rotor and thereby reduce vibration in said fuselage; and
- a vertical restraint assembly connected between said pylon and fuselage for rigidly limiting vertical deflection therebetween;
- said spring means being preloaded downward such that said pylon and fuselage are rigidly connected by said vertical restraint assembly up to a predetermined rotor thrust below that required to maintain flight.

* * * * *